United States Patent
Wang

(10) Patent No.: US 8,991,741 B2
(45) Date of Patent: Mar. 31, 2015

(54) CONVERTIPLANE

(75) Inventor: James Wang, Samarate (IT)

(73) Assignee: Agustawestland S.p.A., Samarate (IT)

( * ) Notice: Subject to any disclaimer, the term of this patent is extended or adjusted under 35 U.S.C. 154(b) by 342 days.

(21) Appl. No.: 13/560,142

(22) Filed: Jul. 27, 2012

(65) Prior Publication Data

US 2013/0026303 A1     Jan. 31, 2013

(30) Foreign Application Priority Data

Jul. 29, 2011 (EP) .................................. 11425208

(51) Int. Cl.
| | | |
|---|---|---|
| *B64C 29/00* | (2006.01) | |
| *B64C 11/00* | (2006.01) | |
| *B64C 3/54* | (2006.01) | |
| *B64C 3/56* | (2006.01) | |

(52) U.S. Cl.
CPC ................ *B64C 11/001* (2013.01); *B64C 3/54* (2013.01); *B64C 3/56* (2013.01); *B64C 29/0033* (2013.01); *Y02T 50/145* (2013.01)
USPC .......................... 244/7 R; 244/12.4; 244/17.23

(58) Field of Classification Search
USPC .... 244/7 R, 7 A, 12.4, 23 A, 23 B, 17.25, 56, 244/66, 45 R, 55
See application file for complete search history.

(56) References Cited

U.S. PATENT DOCUMENTS

| | | | | |
|---|---|---|---|---|
| 2,375,423 | A | | 5/1945 | Lobelle |
| 3,284,027 | A | * | 11/1966 | Mesniere ..................... 244/12.4 |
| 3,335,977 | A | | 8/1967 | Meditz |
| 5,320,305 | A | * | 6/1994 | Oatway et al. .............. 244/12.3 |
| 5,383,627 | A | | 1/1995 | Bundo |
| 6,892,980 | B2 | * | 5/2005 | Kawai .......................... 244/12.4 |
| 7,857,254 | B2 | * | 12/2010 | Parks ........................... 244/12.4 |
| 2011/0046821 | A1 | | 2/2011 | Grabowsky et al. |

FOREIGN PATENT DOCUMENTS

BE     459370     12/1942

* cited by examiner

*Primary Examiner* — Troy Chambers
*Assistant Examiner* — Jamie S Stehle
(74) *Attorney, Agent, or Firm* — Leason Ellis LLP

(57) ABSTRACT

There is described a convertiplane comprising: a pair of semi-wings; at least two rotors which may rotate about relative first axes and tilt about relative second axes together with first axis with respect to semi-wings between a helicopter mode and an aeroplane mode; first axis being, in use, transversal to a longitudinal direction of convertiplane in helicopter mode, and being, in use, substantially parallel to longitudinal direction in aeroplane mode; convertiplane further comprises at least two through openings within which said rotor may tilt, when said convertiplane moves, in use, between said helicopter and said aeroplane mode.

16 Claims, 10 Drawing Sheets

CONVERTIPLANE

The present invention relates to a convertiplane, i.e. a hybrid aircraft with adjustable rotors, capable of selectively assuming an "aeroplane" configuration, in which the rotors are positioned with their axes substantially parallel to the longitudinal axis of the aircraft, and a "helicopter" configuration, in which the rotors are positioned with their axes substantially vertical and crosswise to the longitudinal axis of the aircraft, so as to combine the advantages of a fixed-wing turboprop aircraft and a helicopter.

The ability to adjust its rotors as described enables a convertiplane to take off and land like a helicopter, i.e. with no need for a runway and along extremely steep trajectories, to minimize ground noise and, for example, even take off and land in urban areas; and to fly like an aeroplane capable of reaching and maintaining a cruising speed of roughly 500 km/h, or at any rate higher than the roughly 300 km/h cruising speed of a helicopter, and a typical cruising height of 7500 meters, which is roughly twice that of a helicopter, and enables it to fly above most cloud formations and atmospheric disturbance.

In other words, with respect to a conventional helicopter, a convertiplane has the advantages of almost twice the cruising speed; substantially twice the flying distance and time for a given payload and fuel supply, thus making it cheaper to operate; and over twice the cruising height, thus making it insensitive to weather conditions (clouds, turbulence) over most of the flight. With respect to a conventional aeroplane, on the other hand, a convertiplane has the advantages of being able to hover, and to take off and land in confined spaces, even in urban areas.

BACKGROUND OF THE INVENTION

At present, substantially two convertiplane configurations are known: "Tilt Rotor", in which the semi-wing remain substantially fixed, and only the motor-rotor assemblies rotate relative to the semi-wings; and "Tilt Wing", in which the rotor attitude is adjusted by rotating the semi-wing and rotors system assembly as a whole.

Examples of "Tilt Rotor" configuration are shown in U.S. Pat. No. 6,220,545 or in US-A-2009/0256026. An example of "Tilt Wing" configuration is shown in EP-A-1057724.

Known tilt-rotor convertiplanes substantially comprise a fuselage, a pair of semi-wings projecting on opposite lateral sides of the fuselage, and a pair of nacelles which rotate relative to respective semi-wings.

Each nacelle houses a relative motor-rotor assembly, which, therefore, rotates together with the nacelle relative to the corresponding semi-wing.

In particular, the semi-wings are straight and each nacelle is arranged substantially at the tip of the relative semi-wings.

Accordingly, the position of nacelles reduces the lifting surfaces of the semi-wings.

A need is felt within the industry to increase the lift acting on the tilt-rotor convertiplane both in the aircraft and in the helicopter mode.

As far as the aeroplane mode is concerned, a need is felt to increase the lifting surface of the convertiplane.

As far as the helicopter mode is concerned, a need is felt to reduce the wing shielding effect during the hovering in the helicopter mode. More precisely, the wind shielding effect is caused by the fact that the downwash of rotor partially impinges on the semi-wings, thus reducing the available lift.

Furthermore, a need is felt within the industry to reduce as far as possible the noise generated by the rotors.

A need is also felt within the industry to highly increase the flexibility of the convertiplane, from several points of view.

In particular, firstly a need is also felt within the industry to maximize the aerodynamic efficiency when the convertiplane is operated predominantly in the aeroplane mode during the mission, and to reduce the weight when the convertiplane is operated predominantly in the helicopter mode during the mission.

Secondly, a need is felt to manufacture a modular convertiplane which may easily switch from an unmanned to a manned configuration.

A need is also felt within the industry to increase as far as possible the stability of the convertiplane, especially during the transition between the helicopter and the airplane mode.

Finally, a need is also felt to reduce the bending moments acting on the semi-wings, due to the presence of the tilting rotors.

US-A-2011/003135 discloses a convertiplane comprising a fuselage, a front wing and a back wing, and a pair of booms extending between wing and each supporting a rotor. Rotors are arranged on lateral sides of fuselage and each rotor tilts in an area defined by the relative side of the fuselage and the front and back wings.

U.S. Pat. No. 6,434,768 discloses a convertiplane comprising a wing and a pair of counter-rotating rotors which may tilt relative to wing. Counter-rotating rotors are coaxially mounted and, therefore, both rotate and tilt about the same axis.

SUMMARY OF THE INVENTION

It is an object of the present invention to provide a convertiplane, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
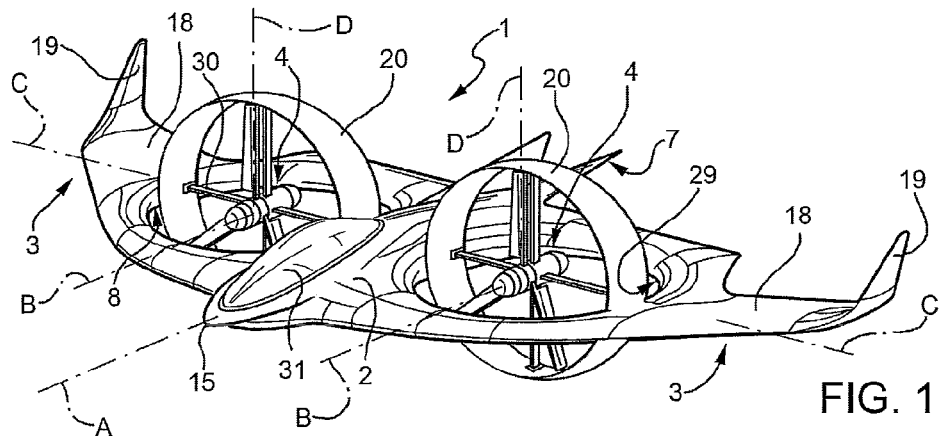
FIG. 1 is a perspective view of a convertiplane according to the invention in an airplane mode.
Figure 2:
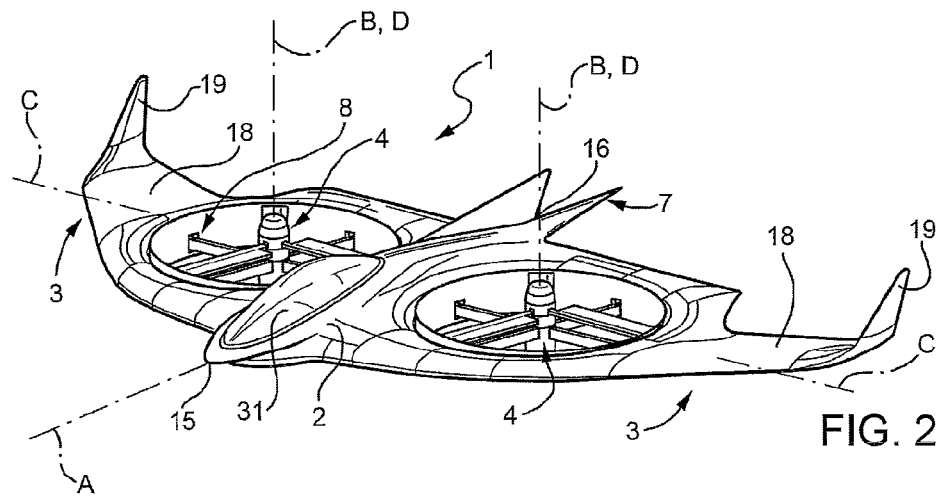
FIG. 2 is a perspective view of the convertiplane of FIG. 1 in a helicopter mode.
Figure 3:
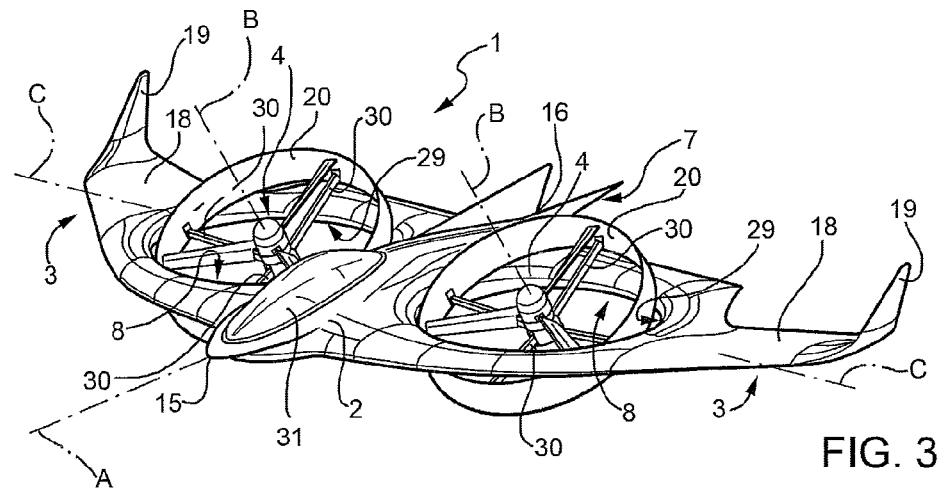
FIG. 3 is a perspective view of the convertiplane of FIGS. 1 and 2 in a transition mode between the helicopter and the aeroplane mode.

Number 1 in FIGS. 1 to 3 indicates as a whole a convertiplane, i.e. a hybrid aircraft capable of being selectively operated in an aeroplane mode (FIG. 1) or in a helicopter mode (FIG. 2).

Convertiplane 1 substantially comprises:
a fuselage 2 elongated along a longitudinal direction A of convertiplane 1;
a pair of semi-wings 3 which project on opposite respective lateral sides of fuselage 2; and
a pair of rotors 4.

In greater detail, fuselage 2 has a forward end 15 a backward end 16 which are opposite to each other, along direction A and define opposite ends of convertiplane 1.

Fuselage 2 also comprises (FIG. 6):
a forward portion 12 housing a cockpit 31; and
a backward portion 13.

Each rotor 4 substantially comprises:
a housing 5;
a shaft 6 supported by housing rotatably about a relative axis B; and
an ogive 14 rotatably integral with shaft 6 about relative axis B.

Each rotor 4 also comprises a plurality of blades 27, three in the embodiment shown, which are articulated relative to shaft 6 through the interposition of a hub 28.

In detail, rotors 4 rotate about relative axes B in opposite directions. In this way, convertiplane 1 does not need an anti-rotation device.

Figure 6:
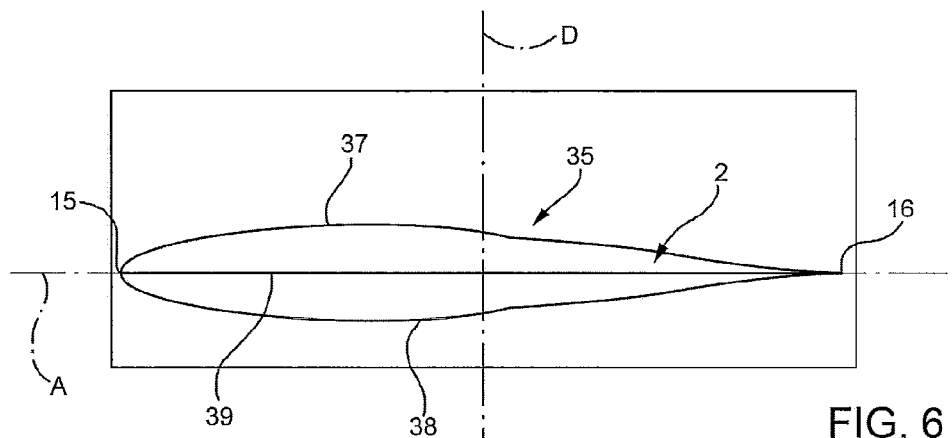
FIGS. 6 and 7 cross sections of first components of FIG. 4 taken along lines VI-VI and VII-VII respectively of FIG. 6.

With reference to FIG. 6, the transversal section of fuselage 2 in a plane parallel to direction A and orthogonal to axis C is shaped as airfoil 35.

More precisely, airfoil 35 comprises:
a leading edge which is defined by end 15;
a trailing edge which is defined by end 16;
a topside 37 which joins ends 15, 16; and
a bottom side 38 which joins ends 15, 16 on the opposite side of topside 37.

Topside and bottom side 37, 38 are, in the embodiment shown both, convex.

Topside and bottom side 37, 38 are, in the embodiment shown, symmetrical relative to a rectilinear chord 39 which connects edges 15, 16.

In this way, airfoil 35 generates a lift, when convertiplane 1 flies with direction A slightly inclined relative to a horizontal plane, due to the fact that the air current direction is not parallel to chord 39.

Convertiplane 1 also comprises:
a V-shaped tail 7, which upwardly projects from portion 13 of fuselage 2; and
a plurality of landing gears 9 downwardly protruding from the bottom side of semi-wings 3.

Each rotor 4 may also tilt together with its respective axis B relative to respective semi-wing 3. In particular, rotor 4 and relative axis B tilt about a respective axis C which is orthogonal to direction A.

More precisely, axes B of rotors 4 are substantially orthogonal to direction A, when convertiplane 1 is operated in the helicopter mode (FIG. 2).

In this way, convertiplane 1 is a "so-called" tilt rotor convertiplane.

Axes B of rotors 4 are substantially parallel to direction A, when convertiplane 1 is operated in the aeroplane mode (FIG. 1).

Advantageously, convertiplane 1 defines a pair of openings 8 within which rotors 4 may tilt, when convertiplane 1 moves between helicopter and aeroplane mode.

Figure 4:
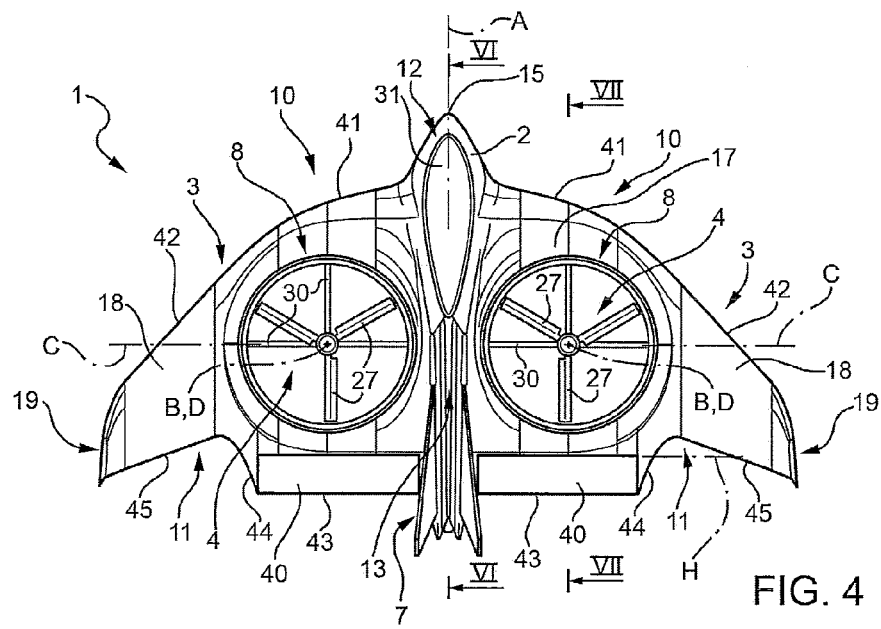
FIG. 4 is a top view of the convertiplane of FIGS. 1 to 3 in a first operative configuration.

In particular, each semi-wing 3 defines a relative opening 8.
Each semi-wing 3 substantially comprises (FIGS. 4 and 5):
a leading edge 10; and
a trailing edge 11 opposite to edge 10 and interacting with air current after edge 10, when convertiplane 1 is advanced along direction A.

Leading edges 10 converge, on respective opposite sides, towards fuselage 2, when proceeding from V-shaped tail 7 to end 15.

More precisely, the distance measured parallel to axis C between edges 10 decreases proceeding from V-shaped tail 7 to end 15.

Each leading edge 10 comprises (FIGS. 4 and 5):
a first curved stretch 41 laterally projecting on a relative side of fuselage 2; and
a rectilinear stretch 42 which defines a prolongation of stretch 41 on the relative opposite side of fuselage 8.

Each trailing edge 11 comprises:
a rectilinear stretch 43 extending parallel to axis C and on a relative lateral side of V-shaped tail 7;
a curved stretch 44; and
a rectilinear stretch 45 opposite to stretch 44 relative to stretch 43 and inclined relative to axis C.

As a result of the conformation of trailing and leading edges 11, 10, semi-wings 3 form a "so-called" delta wing.

Corresponding stretches 42, 45 protrude upwardly from a plane defined by direction A and axis C, so as to form relative winglets 19 which are arranged on respective opposite sides of fuselage 2.

Each opening 8 is arranged between fuselage 2 and relative winglet 19 parallel to relative axis C and is arranged between stretches 41, 43 parallel to direction A.

Each opening 8 extends about an axis D and is, in the embodiment shown, circular.

Furthermore, each opening 8 has an edge 29, circular in the embodiment shown, When convertiplane 1 is operated in the aeroplane mode (FIG. 1), axes B are orthogonal to respective axes D, and rotors 4 protrude from opposite, top and bottom, sides of relative openings 8.

Axes B are also orthogonal to relative axes C.

When convertiplane 1 is operated in the helicopter mode (FIG. 2), axes B are parallel to respective axes D and rotors 4 are axially contained within relative openings 8.

In particular, when convertiplane 1 is operated in the helicopter mode, the thickness of rotors 4 parallel to axes D is less than or equal to the thickness of relative openings 8 parallel to axes D.

Furthermore, the centre of gravity of convertiplane 1 lies on a common direction defined by axes C and is arranged at the same distance from axes D.

In this way, when convertiplane 1 is operated as "helicopter mode", the downward weight vector of convertiplane 1 is balanced by the upward thrust vectors of rotors 4, without generating any de-stabilizing couple about direction A.

Each semi-wing 3 comprises (FIGS. 4 and 5):
a body 17 which defines opening 8; and
a pair of outboard wings 18 which are detachably connected to body 17 on respective opposite sides of fuselage 2.

Figure 5:
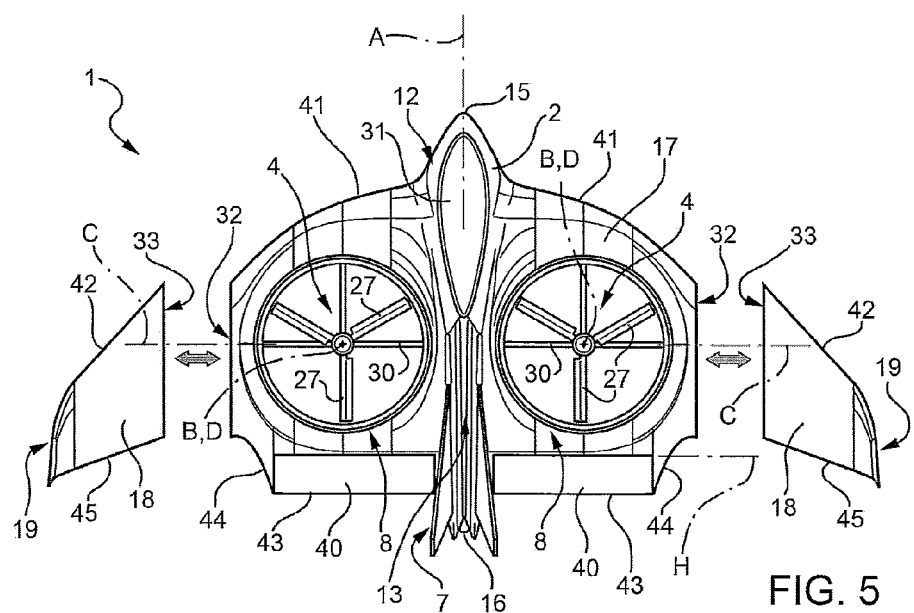
FIG. 5 is a top view of the convertiplane of FIGS. 1 to 3 in a second operative configuration.
Figure 8:
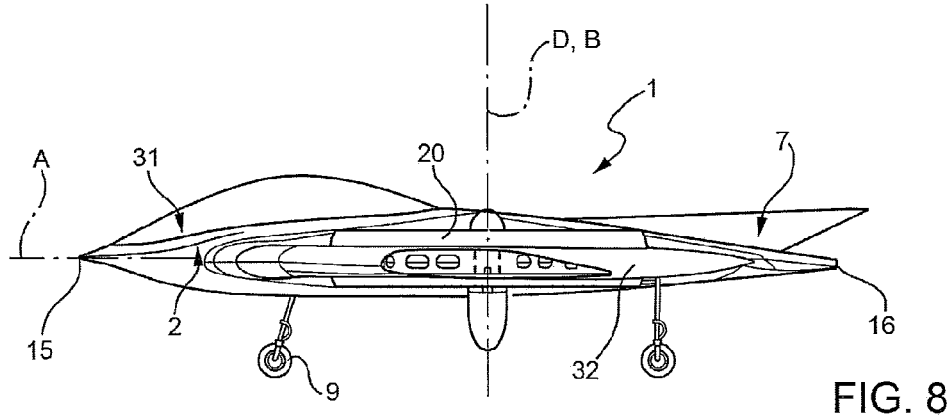
FIG. 8 is a lateral view of the convertiplane of FIGS. 1 to 3 in the second operative configuration.

As a result, convertiplane 1 may be operated:
in a first configuration in which wings 18 are connected to and project, on opposite sides of fuselage 2, from body 17 (FIG. 4); and
in a second configuration, in which wings 18 are removed from body 17 (FIGS. 5 and 8).

More precisely, body 17 comprises fuselage 2 and V-shaped tail 7 and openings 8.

Body 17 is bounded by stretches 41, stretches 43, 44 and by a pair of walls 32 which lies on a plane orthogonal to axis C.

Figure 7:
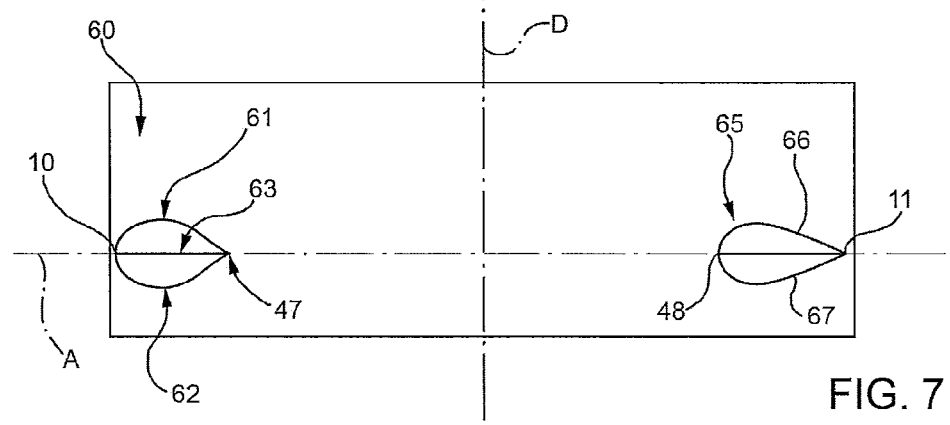

The cross section of body 17 taken a plane orthogonal to axis C comprises a pair of airfoils 60, 65 (FIG. 7).

Airfoil 60 is bounded between leading edge 10 and a forward portion 47 of edge 29 along direction A.

Airfoil 60 comprises a topside 61 and a bottom side 62 which join edges 10 and forward portion 47.

Airfoil 60 extends symmetrically about a rectilinear chord 63 which joins edge 11 and forward portion 47.

Topside and bottom side 61, 62 are, in the embodiment shown, both convex.

Proceeding from forward portion 47 of edge 29 to edge 10, the distance between topside and bottom side 61, 62 measured orthogonal to chord 63 at first is increasing an then is decreasing.

Airfoil 65 is bounded between a rearward portion 48 of edge 29 and trailing edge 11 along direction A.

Airfoil 65 comprises a topside 66 and a bottom side 67 which join rearward portion 48 and trailing edge 11.

Airfoil 65 extends symmetrically about a rectilinear chord 68 which joins edge 11 and rearward portion 48.

Topside and bottom side 66, 67 are, in the embodiment shown, both convex.

Proceeding from edge 11 to rearward portion 48 of edge 29, the distance between topside and bottom side 61, 62 measured orthogonal to chord 63 is at first increasing and then decreasing.

Also in this case, airfoils 60, 65 generate a lift, when convertiplane 1 flies with direction A slightly inclined relative to a horizontal plane, due to the fact that the air current direction is not parallel to chords 63, 68.

Each wing 18 comprises relative winglet 19 and is bounded by relative stretches 42, 45 on opposite sides.

Each wing 18 is also bounded by a wall 33 on the opposite side of relative winglet 19.

Wall 33 of each wing 18 is detachably connected to a relative wall 32 of body 17.

Each wing 18 is, in particular, backward swept to provide roll stability and reducing wing span for obtaining a given amount of lift.

Convertiplane 1 also comprises pair of elevons 40 which are arranged on respective stretches 45 and on respective sides of V-shaped tail 7.

Elevons 40 are hinged to body 17 about an axis H parallel to axis C. In this way, elevons 40 may move upwardly and downwardly relative to body 17 for controlling the pitch and the roll during horizontal flight.

Due to the fact that rotors 4 protrude from semi-wings 3, when convertiplane 1 is operated as an aircraft, the airflow speed acting on elevons 40 is particularly high, so increasing the effectiveness of elevons 40.

Each rotor 4 comprises (FIG. 9):
an annular shroud 20 which ducts relative blades 27; and
a plurality of spokes 30 which are, on relative opposite edges, interposed between respective shroud 20 and housing 5.

In this way, shroud 20 and spokes 30 rotate integrally with blades 27 of each rotor 4 about relative axis C, when convertiplane 1 moves from helicopter and aeroplane mode and vice versa.

On the contrary, shroud 20 and spokes 30 are fixed relative to axis B of each rotor 4.

Figure 10:
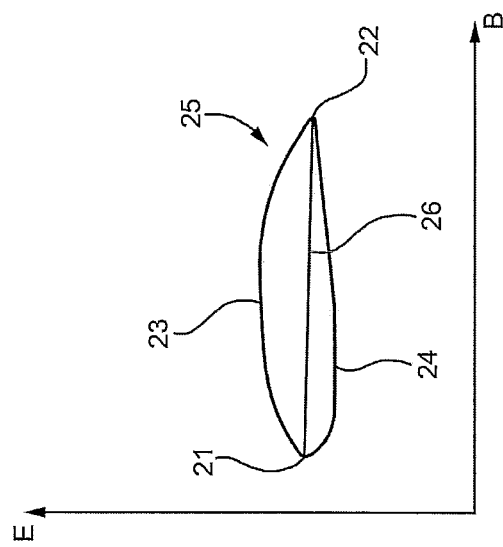
FIG. 10 is a cross section of the fourth component taken along line X-X of FIG. 9.
Figure 9:
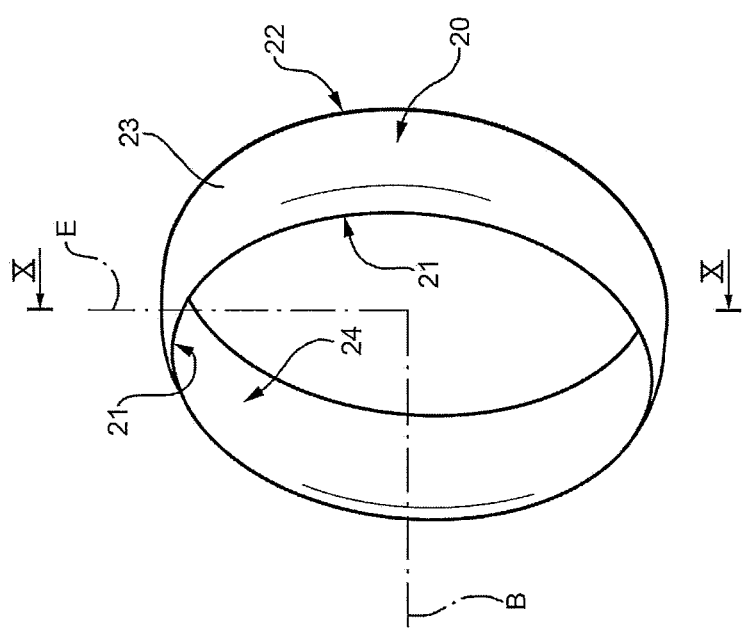
FIG. 9 is a perspective view of a further component of the convertiplane of FIGS. 1 to 4, with parts removed for clarity.

More in detail, each shroud 20 extends about relative axis B and has a thickness about a relative axis E orthogonal to relative axis B (FIGS. 9 and 10).

Each shroud 20 comprises (FIG. 10):
a leading and a trailing edges 21, 22 which are opposite to each other along relative axis B;
a topside 23 which joins edges 21, 22; and
a bottom side 24 opposite to topside 23 and which joins edge 21, 22.

As evident from FIGS. 6 and 7, the cross section of shroud 20 taken in the plane defined by relative axes E, B is configured as an airfoil 25.

In other words, topside 23 and bottom side 24 are antisymmetrical relative to a chord 26 which joins leading and trailing edges 21, 22.

In detail, both topside 23 and bottom side 24 are convex.

Furthermore, the thickness of airfoil 25, i.e. the distance between topside 23 and bottom side 24 measured orthogonally to chord 26, at first increases and then decreases, proceeding from leading edge 21 to trailing edge 22.

Figure 11:
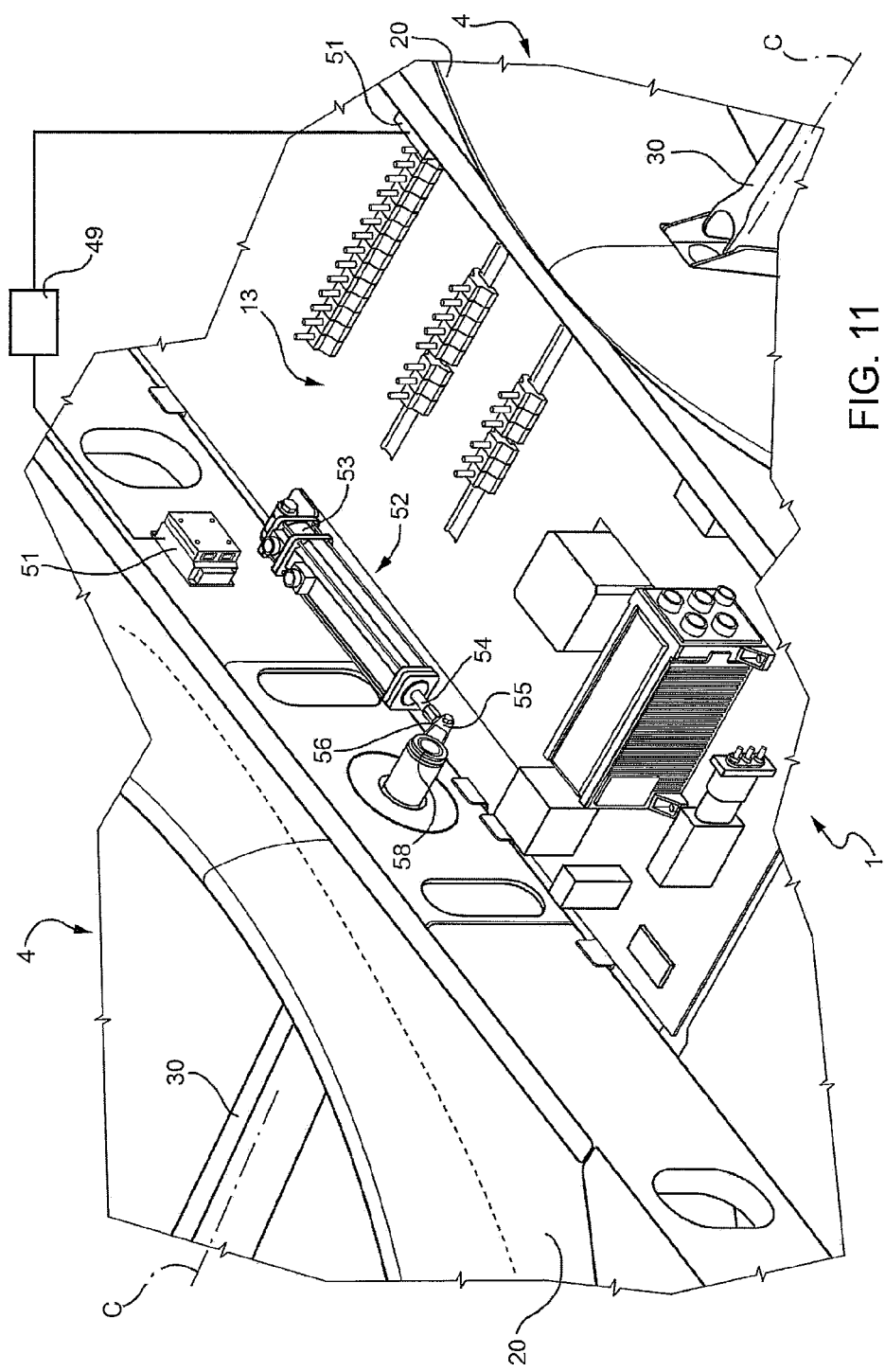
FIGS. 11 to 17 are perspective view of respective components of the convertiplane of FIGS. 1 to 4, with parts removed for clarity.

Convertiplane 1 comprises:
a pair of actuators 52 operatively connected to relative rotors 4 and adapted to tilt rotors 4 about relative axes C; and
a flight control computer 49 (only schematically shown in FIG. 11) adapted to control actuators 52 independently from each other, so that rotors 4 may tilt about relative axes C independently from each other.

Each actuator 52 comprises, in turn,
a fixed part 53;
a ram 54 which may slide parallel to direction A relative to part 53; and
a rod 55 having a first end 56 hinged to ram 54 about an axis parallel to axis C, and end 58 which integrally tilts together with shroud 20 of rotor 4 about axis C.

Each actuator 52 also comprises a control unit 51 for controlling the movement of ram 54 parallel to direction A.

Control units 51 are, in turn, controlled by flight control computer 49 on the basis of a plurality of flight and mission parameters.

The movement of ram 54 relative to fixed part 53 is caused by an electric motor (not-shown).

Furthermore, each actuator 52 comprises a bar 59 which extends parallel to relative axis C.

Bar 59 of each actuator 52 comprises (FIGS. 11 and 12):
an end 90 integral with end 58 of rod 55; and
an end 91 opposite to end 90 and fitted to shroud 20.

Figure 12:
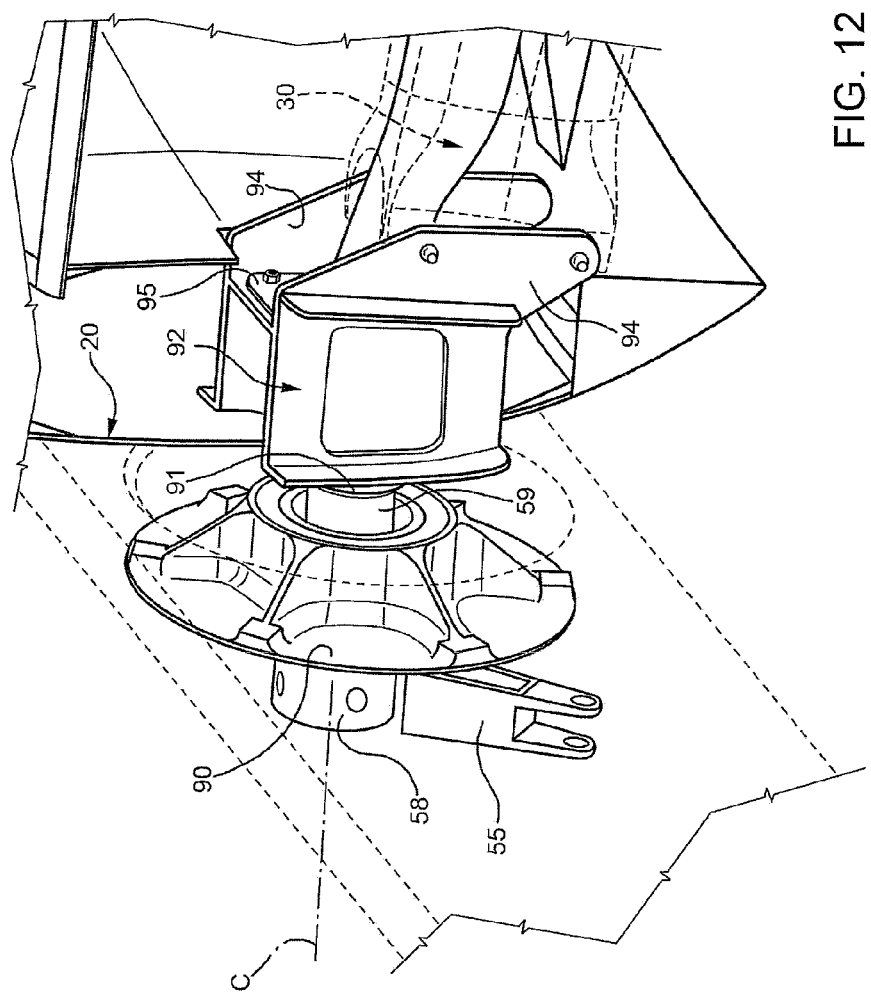

More precisely, convertiplane 1 comprises a plurality of connecting elements 92 (only one of which is shown in FIG. 12) for connecting relative spokes 30 to shroud 20.

In detail, each connecting element 92 comprises a pair of walls 94 fitted to relative spoke 30, and a central portion 95 fitted to a peripheral portion of shroud 20 and coupled with end 91 of bar 59.

In particular, each end 91 and corresponding central portion 95 are coupled by using a splined fitting.

In detail, central portions 95 and ends 91 of bars 59 are partially housed within a cavity defined by shroud 20 (FIG. 12).

Starting from helicopter mode, each actuator 52 may tilt relative rotor 4 towards end 15 or towards end 16.

In other words, during the transition from helicopter to airplane mode, each actuator 52 may tilt relative rotor 4 forward or rearwards relative to axis D.

With reference to FIGS. 13 to 16, convertiplane 1 comprises an electrical power storage device 70; and two pairs of electric machines 71.

Each electric machine 71 comprises, in turn, a stator 72 electrically connected to storage device 70, and a rotor 73 connected to shaft 6 of relative rotor 4.

Each electric machine 71 may be operated as:
an electric motor to directly drive in rotation relative shaft 6 about relative axes B, by using the electrical power stored in storage device 70; or
as an electrical power generator for re-charging storage device 70, by causing the rotation of rotor 4 using wind energy.

In particular, rotors 73 are directly connected to shafts 6.

In the present description, the expression "directly connected" is used to indicate that no transmission system is interposed between rotor 73 and shaft 6.

Accordingly, the angular speed about axes B of shaft 6 and relative rotors 73 is equal.

In detail, when electric machines 71 are operated as electric motors, they are fed with electrical current by storage device 70.

Figure 13:
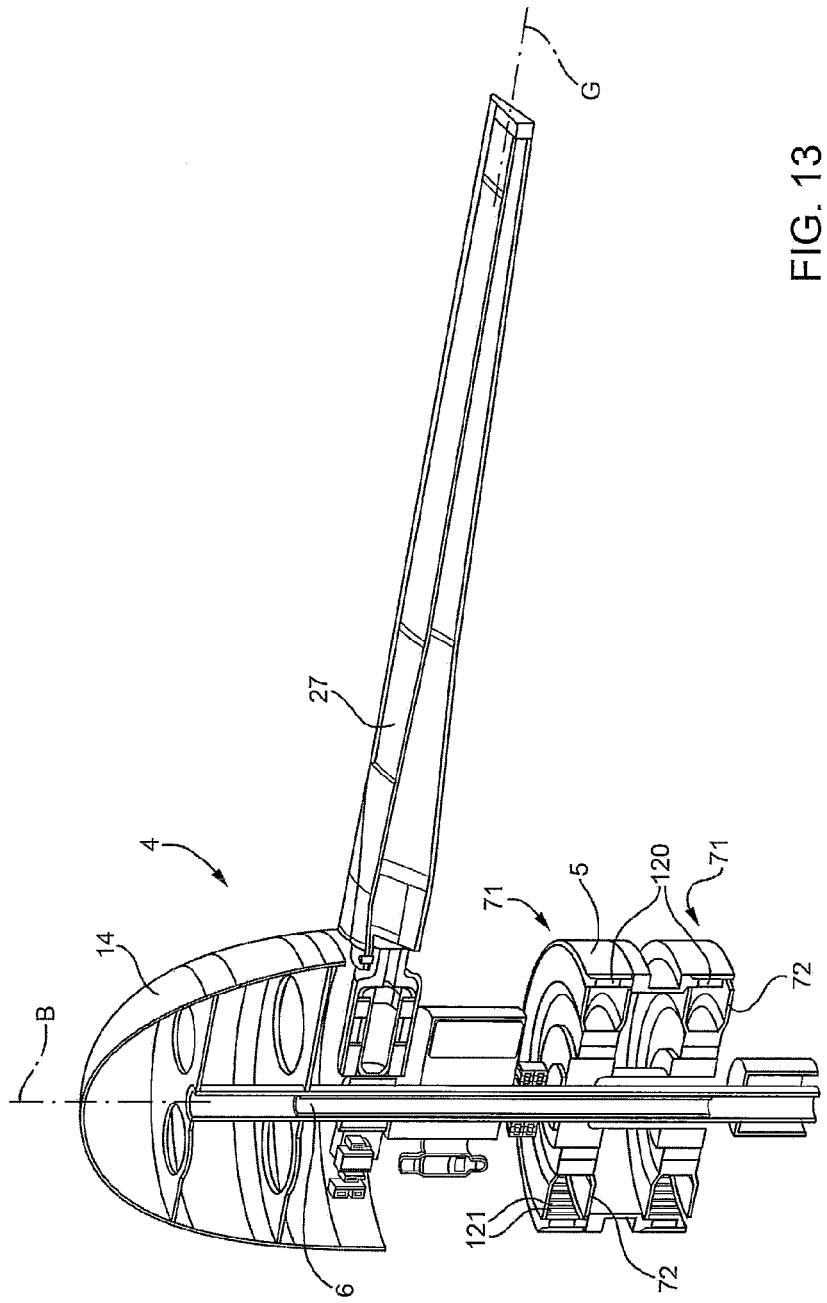

In detail, stator 72 of each electric machine 71 is fitted within housing 5 of relative rotor 4; and rotor 73 of each electric machine 71 is rotatably supported by stator 72 (FIG. 13).

Stator 72 of each electric machine 71 comprises an annular body 120 elongated along relative axes B and defining a plurality of angularly-spaced seats 121. In particular, seats 121 of each electric machine 71 extend radially relative to respective axis B.

Figure 14:
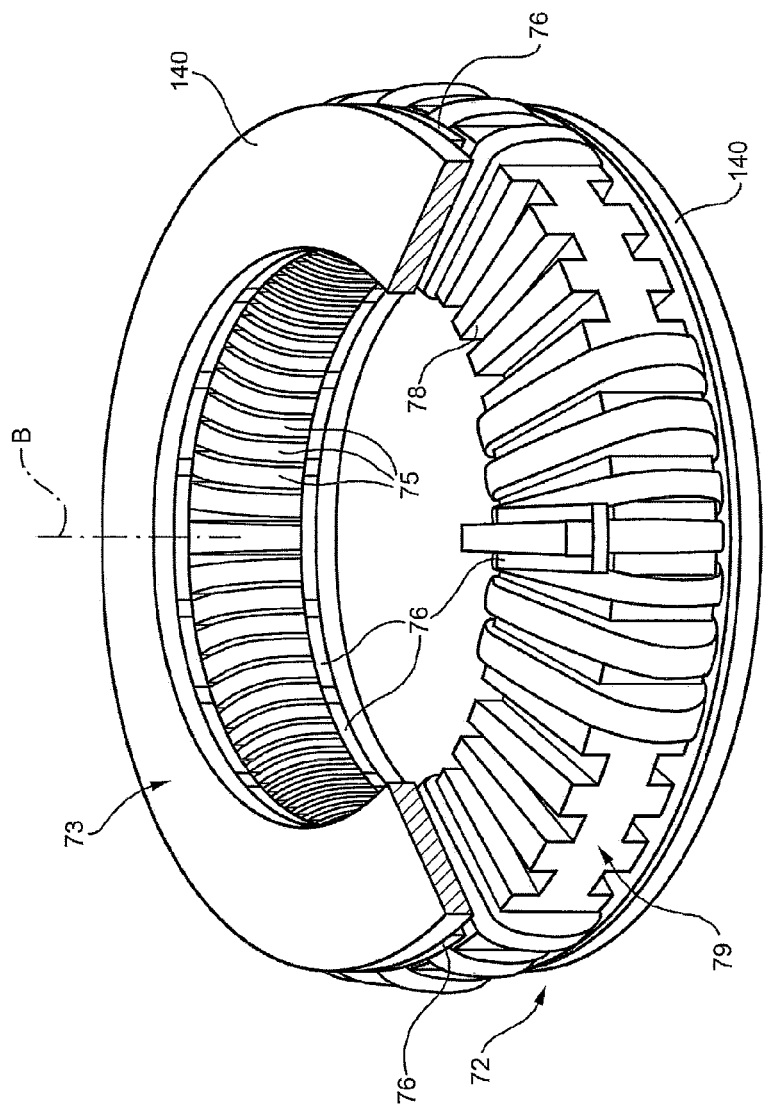

Stator 72 also comprises a magnetic core 79 which defines a helical slot 78 (not-shown in FIG. 13, but only in FIG. 14).

Core 79 is housed within body 120 and slot 78 is annular relative to axis B.

Rotor 73 of each electric machine 71 comprises a pair of annular plates arranged on relative opposite axial sides of relative stator 72.

Electric machines 71 are, in the embodiment shown, axial flux brushless electric machines, i.e. of the type that generates a magnetic flux predominantly extending about axis B.

Each electric machine 71 also comprises:
a plurality of coils 75 which are wound on core 79, housed within slot 78, and fed, in use, with alternate current by storage device 70; and
a plurality of permanent magnets 76 which are angularly integral with rotor 73 and axially interposed between plates of rotors 73 and body 120, so as to be driven in rotation about relative axis B by the magnetic field generated by coils 75.

Permanent magnets 76 of each electric machine 71 are angularly equi-spaced about relative axis B.

Electric machines 71 of each rotor 4 are arranged in series in relation to shaft 6. In other words, the overall torque to which shaft 6 is subjected about axis B equals the sum of torques exerted by each electric motor 71.

Coils 75 are electrically connected to storage device 70 by using wires.

Storage device 70 may comprise (FIGS. 15 and 16):
either one or more electrical battery 81; or
a hybrid battery 82 and an internal combustion engine 83 operatively connected with said hybrid battery 82.

Figure 15:
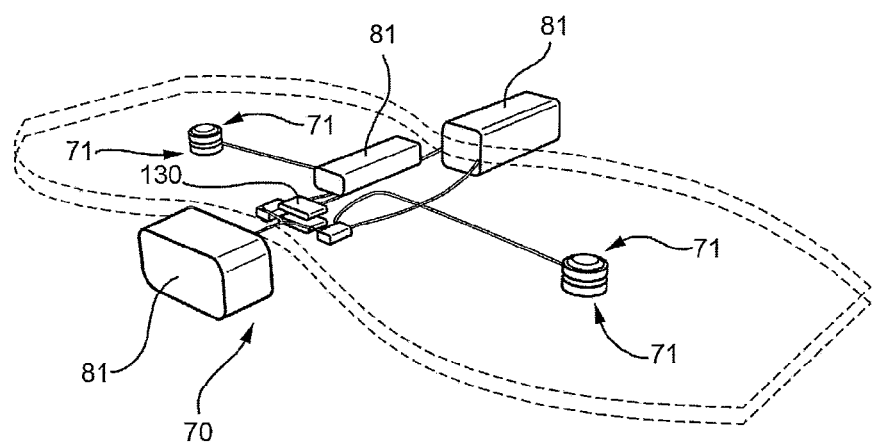
Figure 16:
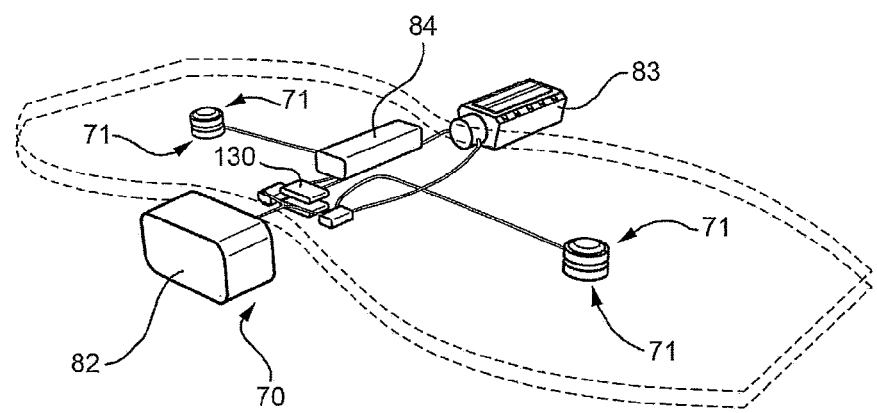

In the embodiment shown in FIG. 15, internal combustion engine 83 recharges hybrid battery 82. In particular, internal combustion engine 83 is a Diesel engine and comprises a tank 84.

Convertiplane 1 also comprises:
a common core which comprises, in turn, semi-wings 3, fuselage 2, rotors 4 and electrical machine 71; and
a module comprising storage device 70, which may be selectively connected to said common core.

Storage device 70 is, in the embodiment shown, a Li-Ion battery.

Convertiplane 1 also comprises a motor controller 130 (FIGS. 15 and 16) which receives electrical power from storage device 70 and regulates the power input into electrical machines 71 to control the motion of shafts 6 of rotors 4.

In detail, motor controller 130 is fed by storage device 70 with a continuous current, converts this continuous current into alternate current and feeds electrical machines 71 with alternate current.

Electric machines 71 may also be operated as an electrical generator during a braking phase of relative shaft 6. In this condition, electrical machines 71 generate electrical current which is stored within battery 81 or battery 82. In other words, electrical machines 71, when operated as an electrical generator, define braking means for braking shafts 6 of relative rotors 4.

Furthermore, convertiplane 1 may be arranged in the aeroplane mode, after that the landing has been completed.

In such a condition, the wind current acting on blades 27 causes the rotation of shaft 6.

Also in this condition, electrical machines 71 are operated as electrical generator and generate electrical current which is stored within storage device 70.

Actuators 52 and battery 81 (or 82) are arranged in portion 13 of fuselage 2.

Fuselage 2 may house a payload pallet and/or a sensor package.

Figure 17:
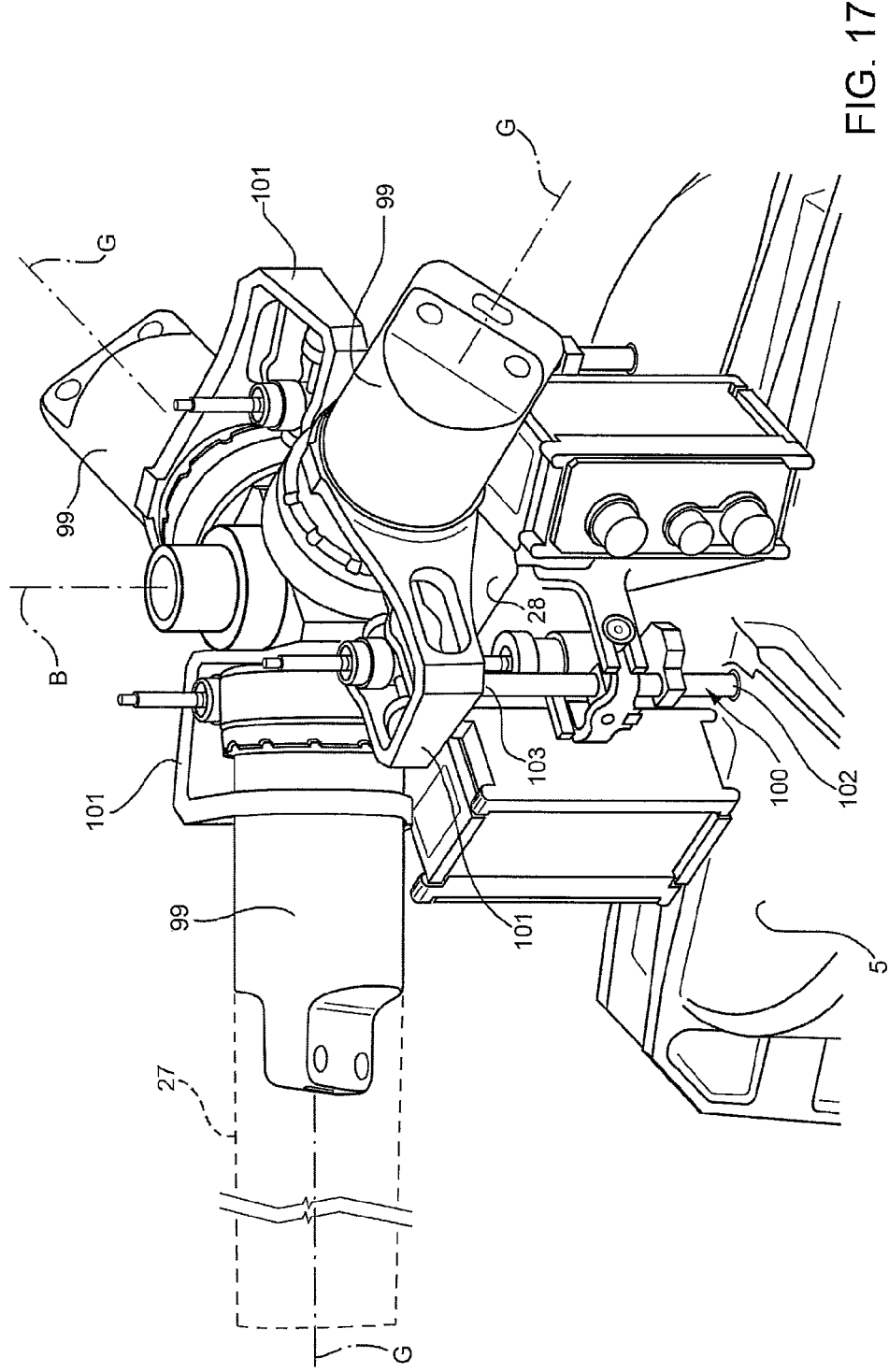

Convertiplane 1 also comprises, for each rotor 4, three variable-length actuators 100 which are interposed between housing 5 and relative blades 27 (FIG. 17).

In detail, each blade 27 (only schematically shown in FIG. 17) extends along a relative axis G and is connected to hub 28 by a relative root connecting element 99.

Each connecting element 99 comprises a C-shaped appendix 101 which is eccentric relative to respective axis G.

Each actuator 100 has a first end 102 connected to housing 5 and a second end 103 connected to appendix 101 of relative blade 27.

End 103 of each actuator 100 may also slide relative to end 102.

In this way, actuators 100 cause the rotation of relative blades 27 about relative axis G.

Accordingly, the angle of attack of each blade 27 is varied.

In particular, actuators 100 may both vary:
the angle of attack of all relative blades 27, i.e. the so-called "collective pitch";
the cyclical variation of the angles of attack of relative blades 27 during their rotation about axis B, i.e. the so-called "cyclic pitch"; and
varying the pitch angles of all relative blades 27, to ensure that lift generated by each blade 27 is the same, so as to avoid the vibration of the rotors 4 due to a unbalance of lift.

Each actuator 100 may also be used for exerting a given force onto relative blade 27, so as to suppress the vibration of this blade 27.

In the embodiment shown, actuators 100 are electro-mechanical.

Convertiplane 1 could also comprise canards and/or tailplane to enhance longitudinal stability.

The operation of convertiplane 1 is described starting from a situation in which convertiplane 1 is operated in the helicopter mode and wings 18 are connected to body 17, which is formed by fuselage 2 and semi-wings 3.

This configuration is typical of the taking off and/or the landing of convertiplane 1.

Wings 18 are connected to body 17 when an increased value of lift is required.

In particular, when convertiplane 1 is operated in the helicopter mode, axes B are orthogonal to direction A and parallel to axes D. Furthermore, rotors 4 and relative shrouds 20 are fully contained within relative openings 8. In other words, the thickness of rotors 4 and shrouds 20 is contained within the size of relative openings 8 parallel to corresponding axes D.

Rotors 4 rotate about relative axes C in opposite direction relative to each other, so that the torques exerted by rotors 4 on convertiplane 1 are balanced.

In detail, shaft 6 of each rotor 4 is driven in rotation about relative axis B by relative pair of electric machines 71 which are operated, in this case, as an electric motor.

Very briefly, coils 75 are fed with alternate current by storage device 70 and generate a variable magnetic flux on permanent magnets 76.

As a result, permanent magnets 76 and, therefore, rotor 73 and shafts 6 are driven in rotation about relative axis B.

Actuators 100 are used for both:
varying the angle of attack of all relative blades 27, thus varying the so-called "collective pitch"; and/or
varying the cyclical variation of the angles of attack of relative blades 27 during their rotation about axis B, thus varying the so-called "cyclic pitch".

When convertiplane 1 is operated in the helicopter mode, the yawing is controlled by tilting one rotor 4 towards end 15 of fuselage 2 and other rotor 4 towards end 16 of fuselage 2.

In this way, rotors 4 generate respective forces parallel to direction A which are equal and opposite to each other. As a result, convertiplane 1 may yaw.

In detail, flight control system 49 control actuators 52 which tilt relative rotors 4 about relative axes C and independently of each other.

Each control unit 51 controls the sliding of ram 54 parallel to direction A.

The translation of rams 54 causes the rotation of rods 55, and, therefore of relative rotors 4 and shrouds 20 about relative axes C.

When it is necessary to operate convertiplane 1 in the aeroplane mode, actuators 52 tilt rotors 4 and relative shrouds 20 about relative axes C and towards end 15.

When convertiplane 1 is operated in the aeroplane mode, rotors 4 and shrouds 20 protrude in part above relative semi-wings 3 and in part below semi-wings 3.

In this way, the airflow generated by rotors 4 impinges both the portion of semi-wings 3 arranged below rotors 4 and elevons 40.

Furthermore, convertiplane 1 flies, when operated in the aeroplane mode, with direction A slightly inclined relative to a horizontal plane, so that air current defines a not null angle with chords 39, 63, 68 of respective airfoils 36, 60, 65.

The majority of the lift is provided by wings 18. The remaining part of the lift is provided by fuselage 2 and shrouds 20 which duct relative rotors 4.

Winglets 19 increase the overall aerodynamic efficiency of convertiplane 1.

During horizontal flight, the roll and the pitch is controlled by rotating elevons 40 about axis H. In detail, elevons 40 may be controlled independently from each other.

V-shaped tail 7 ensures longitudinal stability in the horizontal flight, thanks to its not-shown customary movable vertical surfaces.

Rotors 4 can be braked by operating electrical machines 71 as alternate current electrical generator, instead of electric motor.

In this way, the deceleration of rotors 4 and, therefore, of shafts 6 causes the storage of electrical energy within batteries 81 (or 82).

In case that the mission profile mostly requires convertiplane 1 be operated in the helicopter mode, wings 18 are detached from body 17, without changing the previously described operation of convertiplane 1.

When convertiplane 1 is operated in the aeroplane mode, it can be moved rearwards, by tilting both rotors 4 towards end 16 and with axes B substantially parallel to direction A.

When convertiplane 1 is on ground and storage device 70 needs to be re-charged, rotors 4 are tilted about relative axes C in a direction facing the wind current.

At this stage, the wind current drives in rotation shafts 6 of rotors 4, which in turn, cause the rotation of rotors 73 of electrical machines 71 relative to stators 72.

In other words, electrical machines 71 are operated as electrical power generators which re-charge storage device 70.

The advantages of convertiplane 1 according to the present invention will be clear from the foregoing description.

In particular, convertiplane 1 defines a pair of through openings 8 within rotors 4 tilt.

In this way, when convertiplane 1 is operated in the helicopter mode, the downwash from rotors 4 substantially is not directed onto semi-wings 3.

As a result, semi-wings 3 substantially do not suffer from wind shielding effect during hovering, when convertiplane 1 is operated in the helicopter mode.

Furthermore, rotors 4 tilt in openings 8 which are defined by semi-wings 3.

As a result, semi-wings 3 surround relative rotor 4, instead of protruding bearing rotors as in the prior art solution.

In this way, semi-wings 3 may be configured to generate a considerable amount of lift, when compared with the convertiplane solution described in the introductory part of the present description.

Furthermore, shrouds 20 have an airfoil 25, i.e. have a transversal section which generates a lift when impinged by the airflow, when the convertiplane 1 is operated in the aeroplane mode and axes B are inclined relative to direction A.

Finally, fuselage 2 also defines an airfoil 35 and is smoothly joined to body 17 which, in turn, defines airfoils 60, 65.

In this way, also fuselage 2 and body 17 contribute to the lift generation, when convertiplane 1 is operated in the aeroplane mode and the direction A is slightly inclined relative to a horizontal plane. As a matter of fact, in these conditions, the airflow is inclined relative to chords 39, 63, 68 of respective airfoils 35, 60, 65.

Accordingly, the lift generated by convertiplane 1 is highly increased with respect both in aircraft and helicopter mode, when compared to convertiplane solutions described in the introductory part of the present description.

Convertiplane 1 also comprises shrouds 20 with duct rotors 4 and tilt together with rotors 4 about corresponding axes C.

In this way, the efficiency of rotor 4 is particularly high, because for the same diameter, the thrust of a ducted propeller, as rotor 4, is larger than the thrust of a free propeller.

Furthermore, shrouds 20 are effective in reducing the noise generated by relative rotors 4.

Convertiplane 1 also comprises a pair of elevons 40 which are arranged at trailing edge 11 of semi-wings 3.

In this way, the airflow generated by rotors 4 is directed against elevons 40, when convertiplane 1 is operated in the aeroplane mode.

Accordingly, the airflow speed on elevons 40 is increased, thus increasing the effectiveness of elevons 40.

Wings 18 are detachably connected to body 17. In this way, the flight configuration of convertiplane 1 may be optimized, depending on the mission to be completed.

In detail, when the mission profile mainly comprises forward flight portions, i.e. when convertiplane 1 is mostly operated in the aeroplane mode at high cruise speed rather in the helicopter mode, wings 18 are coupled to body 17. In this way, the aerodynamic efficiency is highly increased.

On the contrary, when the mission profile requires that convertiplane 1 mostly be operated in the helicopter mode and in the aeroplane mode at low speed, wings 18 are detached from body 17. In this way, the overall weight of convertiplane 1 is lowered, since a reduced amount of lift is required by the mission profile.

Semi-wings 3 form a delta wing. This delta wing shape brings the centre of gravity of convertiplane 1 on the common direction of axes C and at the same distance from axes D.

In this way, the stability of convertiplane 1 is highly enhanced in aeroplane and helicopter mode and during the transition between these two modes.

In particular, when convertiplane 1 is operated as "helicopter mode", the downward weight vector of convertiplane 1 is perfectly balanced by the upward thrust vectors of rotors 4, without generating any de-stabilizing couple about direction A.

Wings 18 are also backward swept. In this way, the span of wings 18 is reduced, the lift generated by wings 18 being the same.

Furthermore, the reduction of the span of wings 18 is also useful for reducing the visual signature of convertiplane 1.

Fuselage 2 may easily house cockpit 31 and/or a payload pallet and/or a sensor package.

In this way, convertiplane 1 has a modular design, with a common core, which can be optimized to different roles, for examples surveillance, intelligence, fire-fighting, disaster relief.

Finally, axes D are closer to the centre of gravity of convertiplane 1 (arranged on fuselage 2) than the tips of semi-wings 3. In this way, the bending moments generated by the weight of rotors 4 are dramatically reduced when compared with the bending moments generated by the rotors described in the introductory part of the present description.

Clearly, changes may be made to convertiplane 1 as described and illustrated herein without, however, departing from the scope of the present invention as defined in the accompanying Claims.

In particular, each rotor 4 could be replaced by a pair of counter-rotating rotors 4. In this case, the gyroscopic inertia would be substantially null and the tilting of each pair of rotors 4 would require a reduced torque about axes C.

The invention claimed is:

1. A convertiplane (1) comprising:
   a pair of semi-wings (3);
   at least two rotors (4) which may rotate about a first axes (B) and tilt about relative second axes (C) together with said first axes (B) with respect to said semi-wings (3) between a helicopter mode and an aeroplane mode;
   said first axes (B) being, in use, transversal to a longitudinal direction (A) of said convertiplane (1) in said helicopter mode, and being, in use, substantially parallel to said longitudinal direction (A) in said aeroplane mode;
   said semi-wings (3) comprise relative through openings (8) within which said relative rotors (4) may tilt, when said convertiplane (1) moves, in use, between said helicopter and said aeroplane mode;
   said semi-wings (3) forming a delta-wing;
   said convertiplane (1) further comprising:
   a fuselage (2) from which said semi-wings (3) project on opposite relative sides; said fuselage (2) defining a forward end (15) of said convertiplane (1), proceeding according to an advancing direction thereof;
   a tail (7) projecting from a backward portion (13) of said fuselage (2);
   each said semi-wing (3) having:
   a respective first leading edge (10), which comprises a first curved stretch (41) laterally projecting on a relative opposite side of said fuselage (2); and
   a respective first trailing edge (11) which is opposite to relative first leading edge (10), proceeding along said longitudinal direction (A);
   characterized in that each said first leading edge (10) further comprises a second rectilinear stretch (42) which defines a prolongation of said respective first curved stretch (41) on the relative opposite side of said fuselage (2);
   each said first trailing edge (11) comprising:
   a rectilinear third stretch (43) extending parallel to relative second axis (C) and on a relative side of said tail (7);
   a curved fourth stretch (44); and
   a rectilinear fifth stretch (45) opposite to said fourth stretch (44) and inclined relative to said second axis (C);
   each said opening (8) being arranged between said first and third stretch (41, 43) of a relative said semi-wing (3), proceeding along said longitudinal direction (A).

2. The convertiplane of claim 1, characterized in that said rotors (4) are fully contained within said openings (8), when said convertiplane (1) is operated in said helicopter mode.

3. The convertiplane of claim 1, characterized by comprising at least two shrouds (20) which duct relative rotors (4) and may tilt together with said relative rotors (4) with respect to said semi-wings (3).

4. The convertiplane of claim 3, characterized in that each said shroud (20) is, in a cross section taken in a plane parallel to first axis (B), shaped as a first airfoil (25);
   said first airfoil (25) comprising:
   a second leading edge (21);
   a second trailing edge (22);
   a chord (26) connecting said second leading and trailing edges (21, 22);
   said first airfoil (25) being antisymmetrical relative to said chord (26).

5. The convertiplane of claim 1, characterized in that each said rotor (4) projects on the top of said semi-wing (3), when said convertiplane (1) is operated in said aeroplane mode.

6. The convertiplane of claim 4, wherein the respective first leading edge (10) of each semi-wing (3) converges towards said fuselage (2) and extends at increasing distances from each other, starting from said forward end (15) and proceeding along said longitudinal direction (A);
   wherein the first trailing edge (11) of each said semi-wing (3) comprises a substantially rectilinear trailing edge (11) which is opposite to relative first leading edge (10), proceeding along said longitudinal direction (A);
   each said opening (8) being arranged between respective portions (41, 45) of said first leading edge (10) and first said trailing edge (11) of a relative said semi-wing (3), proceeding along said longitudinal direction (A).

7. The convertiplane according to claim 6, characterized in that the cross section of said semi-wing (3) taken in a plane orthogonal to said second axis (C) comprises:
- a second airfoil (60); and
- a third airfoil (65) arranged on the opposite side of said opening (8) relative to said second airfoil (60);
- said second airfoil (60) being bounded by said first leading edge (10) and by a third trailing edge (29; 47);
- said third airfoil (65) being bounded a third leading edge (29; 48) and by said first trailing edge (11);
- said third leading and trailing edges (29; 47, 48) bounding said opening (8) on opposite sides relative to said longitudinal direction (A).

8. The convertiplane of claim 6, characterized by comprising a pair of elevons (40) movable relative to respective semi-wings (3) and defined by said first trailing edge (11), proceeding along said longitudinal direction (A), so that, when said convertiplane (1) is operated in said helicopter mode, said rotors (4) generate an airflow against said elevons (40).

9. The convertiplane of claim 7, characterized in that said fuselage (2) is smoothly joined to said semi-wings (3) and is configured, in a cross section in a plane orthogonal to said second axis (C), as a fourth airfoil (35).

10. The convertiplane of claim 1 characterized in that each semi-wing (3) comprises:
- a main body (17); and
- a pair of wings (18) detachably connected to said main body (17), so that said convertiplane (1) may be selectively operated in:
- a first configuration in which said wings (18) are connected to said main body (17); and
- a second configuration in which said wings (18) are released from said main body (17).

11. The convertiplane of claim 10, characterized in that said wings (18) are backward swept.

12. The convertiplane of claim 9, characterized by comprising:
- a common core comprising said semi-wings (3), said openings (8) and said rotors (4); and
- a module which can be selectively housed within said fuselage (2);
- said module comprising at least one of a cockpit (31), a payload pallet and/or a sensor assembly.

13. The convertiplane according to claim 1, characterized in that said rotor (4) comprises:
- a shaft (6);
- a plurality of blades (27) rotatable integrally with said shaft (6) about said first axis (B) and articulated with respect to said shaft (6) about respective third axes (G); and
- a plurality of actuators (100) connected to the plurality of blades (27) for causing the rotation of said blades (27) about relative third axes (G) and/or for exerting onto respective blades (27) a force which is directed to suppress the vibration of said blades (27).

14. The convertiplane of claim 13, characterized in that said actuators (100) are electro-mechanical actuators (100).

15. The convertiplane according to claim 1, characterized in that said openings (8) have respective third axes (D), and in that said convertiplane (1) comprises a centre of gravity which lies on a direction common to said second axes (C) and is arranged at the same distance from said third axes (D).

16. The convertiplane of claim 1, characterized in that said rotors (4) generate the lift necessary to the flight of said convertiplane in said helicopter mode.

* * * * *